CHARLES HUIE.
Improvement in Driving-Bits.

No. 126,704. Patented May 14, 1872.

Witnesses:
A. W. Almqvist
W. O. Graham

Inventor:
Charles Huie,
per
Attorneys.

UNITED STATES PATENT OFFICE.

CHARLES HUIE, OF NEW YORK, N. Y.

IMPROVEMENT IN DRIVING-BITS.

Specification forming part of Letters Patent No. 126,704, dated May 14, 1872.

Specification describing a new and useful Improvement in Driving-Bit, invented by CHARLES HUIE, of New York city, in the county and State of New York.

Figure 1:
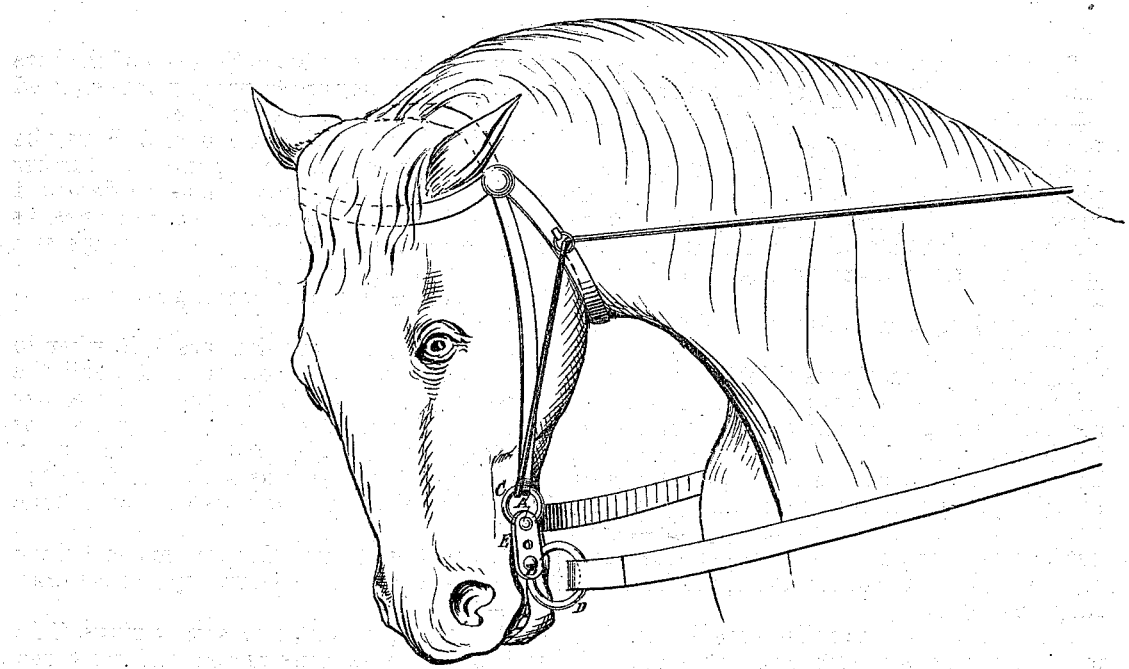
Figure 2:
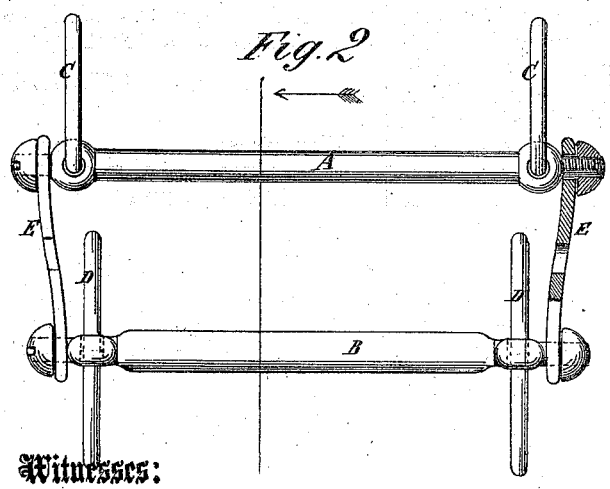
Figure 3:
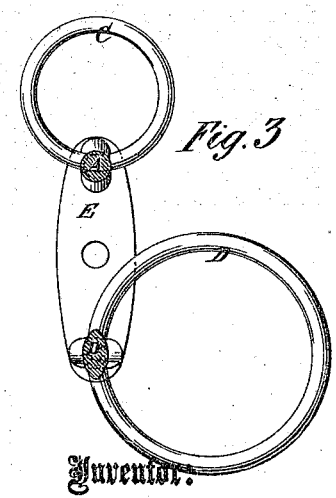

Figure 1 represents my improved bit as applied to a horse's mouth. Fig. 2 is a front view of the bit, part being broken away to show the construction. Fig. 3 is a cross-section of the same taken through the line $x \, x$, Fig. 2.

Similar letters of reference indicate corresponding parts.

My invention has for its object to furnish an improved horse's bit, which shall be so constructed as to give the driver full control over the horse, and which shall, at the same time, be easy upon the horse's mouth, and may be so adjusted as to relieve his mouth when sore, and allow it to heal; and it consists in the bars, link-plates, and rings, constructed and combined with each other, as hereinafter more fully described.

A and B are two parallel bars designed to enter the horse's mouth, and in which, near their ends, are formed holes to receive the rings C D, respectively. The upper bar A is made round and longer than the lower bar B, to correspond with the natural taper of the horse's mouth. The lower bar B is flattened or made oval in form, so that it may bear smoothly and easily upon the jaws. E are link-plates, which have two or more holes formed in them to receive the ends of the bars A B, to which they are secured by nuts screwed upon the ends of said bars A B.

By this construction the bars A B may be readily adjusted closer together or further apart, or the link-plates E may be detached and replaced with longer or shorter ones, as may be required. The head-stall straps and the check-reins are designed to be buckled into the rings C, and the driving-reins into the rings D.

By this construction the bars A B, when in use, lie loosely in the horse's mouth, and the horse is guided by pulling upon the lower bar B. Should the horse become frightened or be ugly or vicious, by pulling strongly upon the reins the bit acts as a lever to force the horse's jaws apart, and thus at once subdue him.

Having thus described my invention, I claim as new and desire to secure by Letters Patent—

The two bars, A B, two sets of rings, C D, and link-bars E, constructed and combined with each other substantially as herein shown and described, and for the purpose set forth.

CHARLES + HUIE.
his
mark.

Witnesses:
JAMES T. GRAHAM,
T. B. MOSHER.